Figures 1, 2:
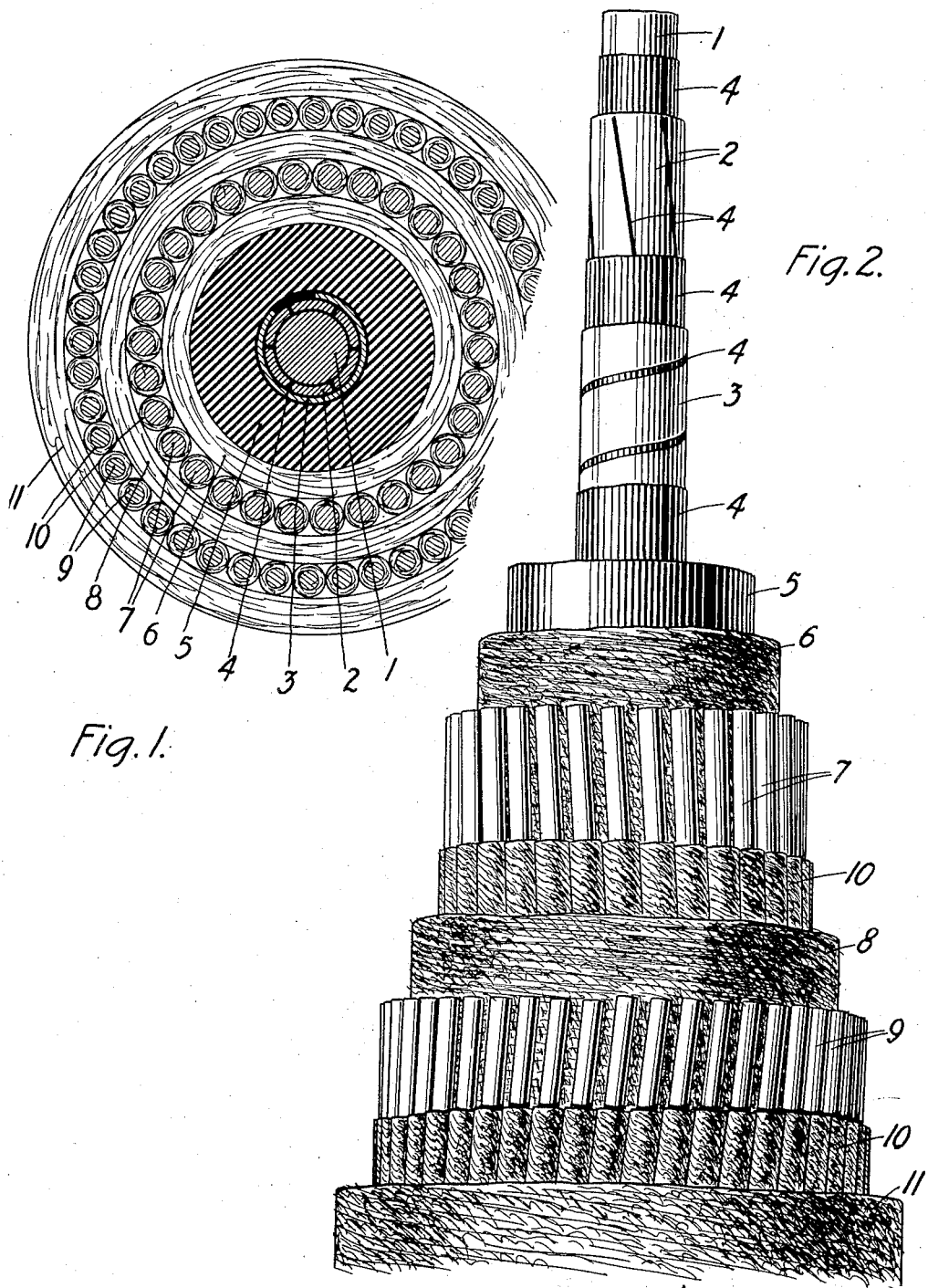

Dec. 3, 1929.  A. M. CURTIS  1,738,234

SUBMARINE CABLE CONSTRUCTION

Filed Nov. 10, 1923

Inventor:
Austen M. Curtis
by E. W. Adams Atty.

Patented Dec. 3, 1929

1,738,234

UNITED STATES PATENT OFFICE

AUSTEN M. CURTIS, OF EAST ORANGE, NEW JERSEY, ASSIGNOR TO WESTERN ELECTRIC COMPANY, INCORPORATED, OF NEW YORK, N. Y., A CORPORATION OF NEW YORK

SUBMARINE-CABLE CONSTRUCTION

Application filed November 10, 1923. Serial No. 673,972.

This invention relates to improvements in submarine cable construction.

Submarine cables as commonly constructed for deep sea signal lines comprise a central conductor which may consist of one or more individual conducting wires or strands, a thick insulating envelope of gutta percha or other insulating material and a protecting armor consisting of a sheath of steel wires wound spirally about the interior portion of the cable. This armor serves as a protection against mechanical injury and to give the cable the necessary tensile strength.

The weight which must be supported in lowering a cable at a sea depth of two or three miles is very great and the tensile force exerted on the cable at the ship may amount to as much as four tons. It has been discovered that the spiral armor, when subject to this tensile force, tends to straighten out. At least two disadvantageous effects ensue from this action of the armor. The first is the tendency of the armor wires to untwist in that portion of the cable where the tensile force is greatest and where least opposition to such untwisting is met and to relieve this by greater twisting at a point on or approaching the sea floor with the result that a bend, kink, or other deformation occurs at that point. The second is the constricting effect on the interior of the cable as the armor wires tend to straighten out under the influence of the great tensile force to which they are subjected. Bends and kinks make it difficult to again lift the cable without damaging it and are, accordingly, very harmful. Even if the cable is not to be raised they are apt to impose such strains on the dielectric material as to speedily induce faults.

There has recently been developed a submarine cable continuously loaded with a tape of a magnetic alloy which has such remarkable magnetic properties at the low flux densities encountered in submarine telegraph cable practice as to increase by several times the feasible signalling speeds which can be attained with existing cables. The magnetic properties of this alloy are highly dependent upon conditions of strain to which it may be subject. Attention is called to the discussion of this material in an article by Arnold and Elmen published in the Journal of the Franklin Institute, May, 1923, vol. 195, No. 5. For loaded cable of this type it is particularly important that distortions, deformations, and nonuniform stress be reduced to a minimum. The imperative necessity of guarding such a cable against nonuniform pressures, or kinking will therefore be apparent.

An object of this invention is to prevent or reduce the nonuniform stresses and deformations to which deep sea cables are subjected.

A further object of the invention is to maintain the magnetic qualities of a loaded cable as nearly as possible unimpaired by forces operating upon the cable during and subsequent to laying.

These general objects and others which will be apparent from the following description are attained by a special design of cable which to a large degree causes the distorting forces to be neutralized.

This neutralization is attained by opposing to the twisting force of the spiral armor, an equal and opposite twisting force of a second armor having a spiral in the opposite direction.

The novel features, which are considered characteristic of the invention, are pointed out with particularity in the appended claims. The invention, itself, however, both as to the details of its organization and its mode of operation will best be understood by reference to the following description taken in connection with the accompanying drawing in which Fig. 1 illustrates in section a cable structure embodying the invention and Fig. 2 illustrates in elevation a portion of the cable structure with parts broken away.

Referring to the drawing, 1 represents the central copper conductor surrounded by a plurality of helically applied segmental conducting strips 2 which cooperate with member 1 to form a flexible conductor of sufficient conducting cross section. Surrounding the flexible conductor is the loading material 3 which is preferably in the form of a helically applied tape wound about the stranded conductor. This tape preferably consists of a composition known as permalloy and which includes about 80% of nickel and 20% of iron. The characteristics of this material are disclosed in the Franklin Institute article to which reference has been previously made.

Surrounding the loaded conductor is a thin layer of a semi-fluid compound 4 which also fills all the interstices of the conductor. Its purpose is to provide a uniform distribution of pressure about the permalloy tape when the cable is subjected to pressure as in immersion in great depths of water. Outside the layer of compound is the insulating covering 5 of gutta percha.

About the gutta percha insulating covering is a serving 6 of jute which provides a foundation for the inner armor wires 7 which are wound in a right hand spiral or clockwise advancing toward the right. Outside this armor is another serving 8 of jute. A second armor similar to the first but wound in a left hand spiral consists of wires 9 preferably so designed in size and number as to neutralize the twisting tendency of the inner armor.

As it is desirable to be able to use standard round wires for the armor, the outer wires 9 may be of a smaller size than wires 7. However, the outer armor may be put on with a different pitch or lay than the inner armor and may in some instances consist of larger wires.

The essential requirement, however, is that the twisting or deforming action of the one armor, when the cable is subjected to tension, be neutralized to the greatest possible degree by the opposing force of the other armor.

It will be appreciated that a cable with oppositely wound armor, as disclosed, may be readily coiled in any direction. To facilitate coiling each armor wire is preferably provided with a wrapping of jute or similar material to space adjacent armor wires and to enable them to approach each other without cramping. A serving 11 of jute surrounds the outer armor.

Should unequal static pressures occur which are temporary or not excessively different in magnitude, the semi-fluid compound will flow until these are equalized. If, however, the cable were to kink the armor wires might be forced toward the central conductor with such pressure as to establish an area of solid contacts into which the compound could not penetrate. The forces at different points of such areas might be altogether nonuniform and, moreover, greatly in excess of the forces along the remainder of the cable which the compound readily equalizes. The occurrence of such excessive pressures is minimized by this invention and the differences in pressure at various points are maintained less than can be readily equalized by the semi-fluid compound. There is accordingly a peculiar co-operation between the armor and the pressure equalizing fluid in preventing permanent inequalities of strain on the interior parts of the cable and especially upon the loading material.

In other respects than those mentioned standard cable practice may be followed.

It will be appreciated that the principle underlying this invention is of particular importance in permalloy loaded cable in conserving the magnetic characteristics of the loading material. However the invention is also applicable to cables of the usual type to facilitate coiling, to prevent kinking and other deformation, and to make easier laying and subsequent raising of the cable.

What is claimed is:

A deep sea cable comprising an insulated conductor and two oppositely wound spiral armors surrounding said insulated conductor each of said armors comprising individual wires separated from each other and from the wires of the other armor by yielding material whereby the armored cable may be readily coiled in any direction.

In witness whereof, I hereunto subscribe my name this 3rd day of November A. D., 1923.

AUSTEN M. CURTIS.